Dec. 18, 1962     A. WARSHER     3,069,622
TIME INDICATOR

Filed Feb. 4, 1958     2 Sheets-Sheet 1

INVENTOR.
ADOLPH WARSHER
BY
ATTORNEY

Dec. 18, 1962     A. WARSHER     3,069,622
TIME INDICATOR

Filed Feb. 4, 1958     2 Sheets-Sheet 2

INVENTOR.
ADOLPH WARSHER
BY
*ATTORNEY* ed States Patent Office 3,069,622
Patented Dec. 18, 1962

3,069,622
TIME INDICATOR
Adolph Warsher, Ridgewood, N.J., assignor to The Bendix Corporation, a corporation of Delaware
Filed Feb. 4, 1958, Ser No. 713,253
11 Claims. (Cl. 324—68)

The invention relates generally to time indicators and more particularly to devices for indicating the total time equipment has been operated.

In many instances, it is desirable to measure the total time devices or sub-assemblies, such as vacuum tubes, motors, heating elements, hydraulic actuators, amplifiers, etc. have been operated so that the devices or sub-assemblies can be replaced when they approach the end of their predicted trouble-free operation to avoid failure of the equipment in which the devices or sub-assemblies are used. This is especially important on aircraft where failure of a small device or sub-assembly may cause the airplane to crash with loss of life.

One object of the invention is to provide a simple device which is highly accurate and reliable for measuring the total time equipment is operated.

Another object is to provide a time sensing device which may be used with a remote indicator or controller.

Another object is to provide an operating time sensing arrangement, a parameter of which changes measurably as a function of time.

Another object is to provide a device which integrates time of operation.

The invention contemplates a device for sensing the time during which a voltage is applied thereto, comprising a target having metal deposited thereon, and a heater adapted to be energized by the voltage and arranged to vary the metal deposited on the target as a function of time of energization of the heater. The heater may be arranged to deposit metal on the target or to heat the target and evaporate metal from the target as a function of time of energization of the heater. The invention also contemplates the use of means for measuring the quantity of metal deposited on the target to indicate the time of operation of the device or to control equipment whose time of operation is being measured. The measuring means may comprise electrical means for measuring the resistance of the target, or photosensitive means for measuring the light reflecting properties of the target.

The foregoing and other objects and advantages of the invention will appear more fully hereinafter from a consideration of the detailed description which follows, taken together with the accompanying drawings wherein several embodiments of the invention are illustrated. It is to be expressly understood, however, that the drawings are for the purposes of illustration and description, and are not to be construed as defining the limits of the invention.

Figure 1:
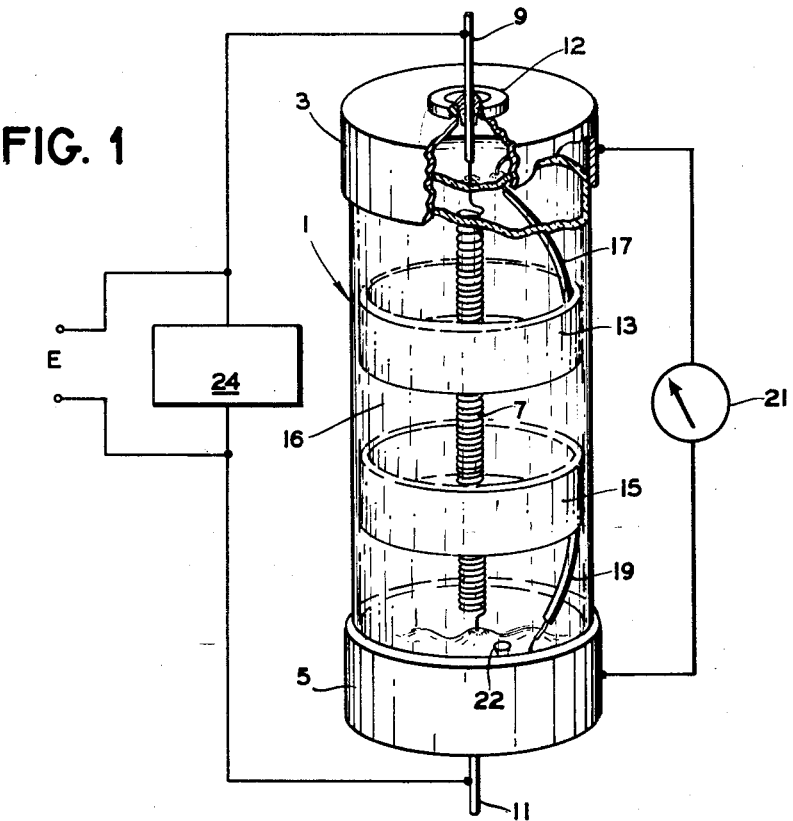
FIGURE 1 is a schematic perspective view of a time sensing device and indicator constructed according to the invention.

Referring to FIGURE 1 of the drawings, a novel device constructed according to the invention for measuring total time of operation of electrical equipment is shown therein and comprises a sensor having cylindrical glass envelope 1 sealed at its ends and preferably the shape and size of a 3AG fuse with the inner surface of controlled diameter. A pair of metallic bands 13, 15, preferably of silver or platinum, are applied by plating or other suitable means at spaced points on the inner surface of the envelope to provide a target 16 on the inner surface of the envelope therebetween, and the bands are connected by connectors 17, 19 in any suitable manner to end caps 3, 5 respectively.

A spiral heater 7 extends axially of the envelope within the target and is provided at its ends with terminals 9, 11 for connection across a source of voltage when the device, whose time of operation is to be measured, is energized. The terminals 9, 11 are fixed to end caps 3, 5, respectively, but are insulated electrically therefrom by suitable insulators 12. Heater 7 comprises a high melting point metal, such as tungsten, covered by a lower melting point metal, such as nickel, which is evaporated and deposited on target 16 when the heater is energized. The ends of heater 7 and connectors 17, 19 are sealed in envelope 1 in any suitable manner.

The envelope after sealing is baked out, evacuated through an exhaust tube 22, and filled to a desired pressure with an inert gas, such as helium, which is non-ionizing at the potential across heater 7. The gas pressure is adjusted at the design center value of heater voltage to provide a mean free path less than the distance between heater 7 and target 16 for the metal molecules evaporated from the heater to inhibit their deposition on the target. Increase of pressure above a critical value substantially reduces the number of molecules reaching the target in unit time at a given heater temperature. The pressure at minimum operating temperature, which is determined by the heater voltage, should be above the critical value.

Figure 2:
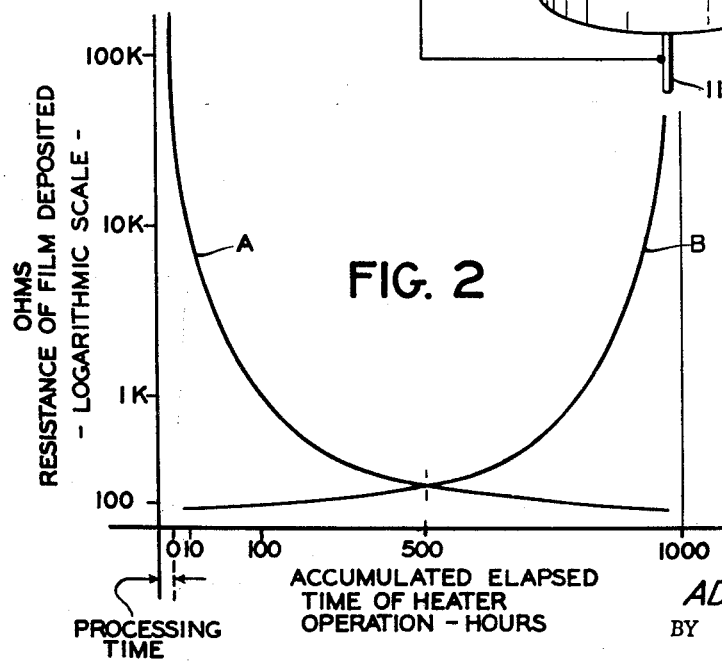
FIGURE 2 is a curve showing the change of resistance with time of operation of the device.

As shown by curve A in FIGURE 2, the device before use has infinite resistance between end caps 3, 5 because at this time no metal is deposited on target 16. The device preferably is operated initially before using it to perform its timing function until the resistance between end caps 3, 5 assumes a desired value as determined by the quantity of metal deposited on target 16. A suitable value is 100,000 ohms. The metal preferably is deposited at a rate so that after an additional 10 hours the resistance between end caps 3, 5 is reduced from 100,000 ohms to 10,000 ohms. In the period from 10 hours to 100 hours the resistance preferably is reduced to 1,000 ohms. With this arrangement, the resistance versus time curve is logarithmic so that good definition or accuracy occurs during the early stages of use of the device, that is, the first 10 hour period of use produces a greater change in resistance than the period from 10 to 100 hours and similarly from 100 to 1,000 hours. This permits accurate time measurement during the early life of the equipment when failure of components is likely to occur.

To measure the time equipment is operated, heater terminals 9, 11 may be connected to an A.C. or D.C. voltage source E, preferably of regulated voltage in parallel with equipment 24 being timed, if the equipment is operated electrically, and the resistance between end caps 3, 5 is measured by an ohmmeter 21 which may be calibrated to indicate directly the time of operation of the equipment.

Figure 3:
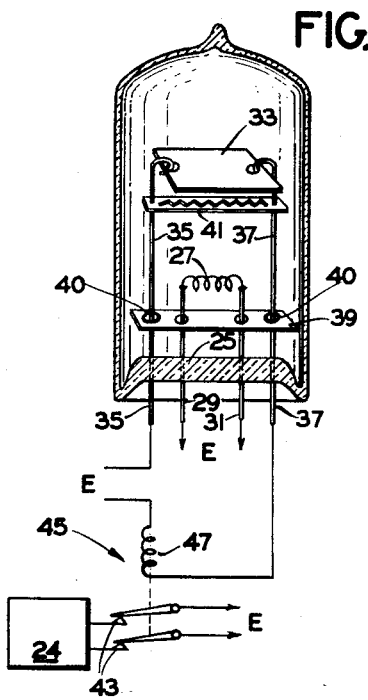
FIGURES 3, 4, 5 and 6 are schematic perspective views of other embodiments of the invention, FIGURE 3 showing the device controlling operation of a relay and FIGURES 4, 5 and 6 showing arrangements for indicating time of operation.

In FIGURE 3 is shown another embodiment of the invention comprising a stem 25 mounting an evaporative heater 27 by conductors 29, 31 for connection to a voltage source E. A target 33, preferably of mica or glass on which the evaporated metal from heater 27 is deposited, is supported from stem 25 by conductors 35, 37 for connection to an external circuit. A splatter shield 39 of mica is positioned between heater 27 and stem 25 and is mounted on stem 25 in any convenient manner such as by captive eyelets 40 spot welded to conductors 35, 37.

A target shield 41 of mica or other suitable material having a selected continuous cut-out pattern therein may be positioned between the target 33 and heater 27 to extend the measurable time scale. The target shield is mounted on conductors 35, 37 and, if the target shield is made of metal or other conducting material, is insulated from conductors 35, 37.

A glass envelope encloses target 33, heater 27, splatter shield 39, and target shield 41 and is sealed to stem 25. The envelope is baked, evacuated and filled with gas as in the arrangement of FIGURE 1.

The device may be used to control operation of a relay 45 to energize or deenergize equipment 24 connected to a voltage source E through relay contacts 43. Target 33 is connected in series with relay solenoid 47 and voltage source E by means of connectors 35, 37.

During initial operation of the device, relay solenoid 47 is not energized sufficiently because of the high resistance of target 33 to operate relay contacts 43, but as the resistance of target 33 decreases to a predetermined value corresponding to a given time, solenoid 47 is energized sufficiently to operate contacts 43 and energize or deenergize equipment 24. The voltage source E may be the same or separate and any convenient actuator or deactuator may be used instead tof relay 45.

Figure 4:
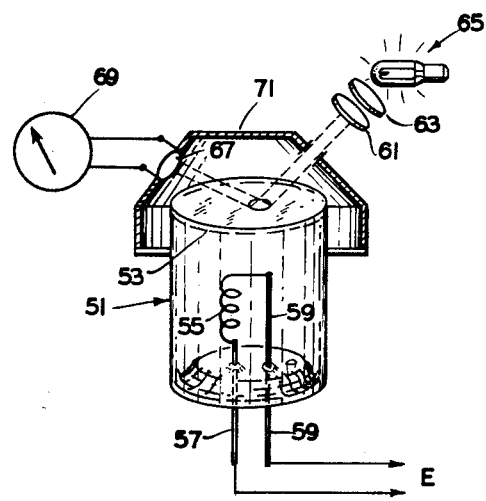

The embodiment shown in FIGURE 4 measures the variation in light reflecting properties of the target instead of measuring resistances as in the embodiments of FIGURES 1 and 3. In the arrangement of FIGURE 4, a gas-filled sealed cylindrical envelope 51 of transparent material, such as glass, has a target 53 formed at one end and encloses a heater 55 mounted on terminals 57, 59 for connecting the heater to a voltage source E. A pair of collimating lenses 61, 63 project a beam of light from a light source 65 onto target 53 and the amount of light reflected is a measure of the amount of metal deposited on target 53 by evaporation from heater 55. The reflected light beam actuates a silicon or germanium photo diode 67 connected to an indicating meter 69 which may be calibrated to indicate directly the time of operation of the device. The amount of light reflected from the target area depends on the thickness of the coating of the target and is a function of time of energization of heater 55. A hood 71 mounting the photo diode and having an aperture for the light beam shields the photo diode from stray light.

Figure 5:
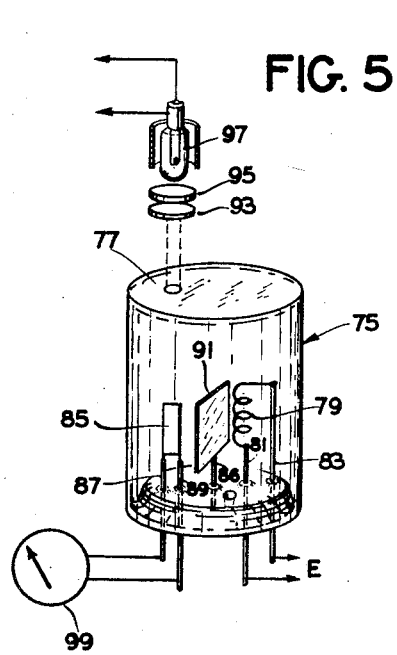

The arrangement shown in FIGURE 5 measures the amount of light passing through the target on which metal is deposited. The device comprises a sealed gas-filled cylindrical envelope 75 having a target 77 at one end on which metal is deposited by evaporation from heater 79 supported on terminals 81, 83 for connecting the heater to a voltage source E. A silicon or germanium photo diode 85 is mounted within the envelope by connectors 87, 89 and is shielded from heater 79 by a shield 91 positioned between heater 79 and photo diode 85 and mounted on a support 86. A beam of light is projected by collimating lenses 93, 95 from a light source 97 onto target 77 and the quantity of light passing through the target and energizing photo diode 85 is a measure of time the device is operated and this may be indicated directly on an indicator 99. Photo diode 85 may be shielded from stray light in any suitable manner as by coating the surface of envelope 75 with opaque material except where the light beam enters the envelope.

Figure 6:
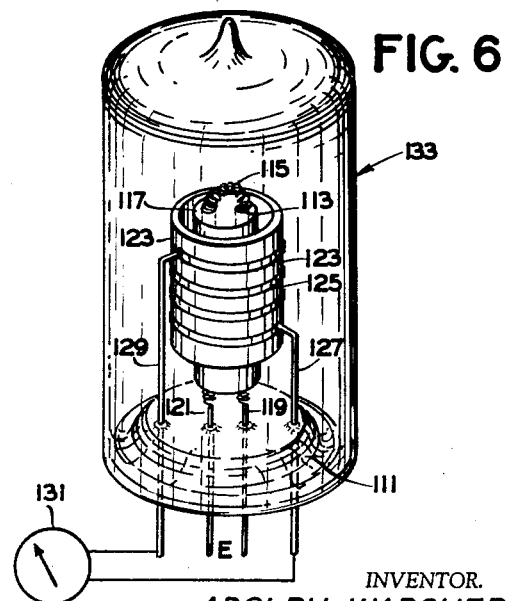

The device shown in FIGURE 6 measures the resistance of the target as in FIGURES 1 and 3, but metal, instead of being deposited on the target, is removed from the target by evaporation so that the target gradually increases in resistance as a function of time, as shown in FIGURE 2 by curve B. The device comprises a stem 111 mounting a heater 113 comprising a U-shaped filament 115 enclosed within an insulating member 117 and supported from the stem by connectors 119, 121. A cylindrical target 123 of insulating material, having metal deposited thereon preferably in the form of a spiral 125, surrounds the heater and is heated thereby so that the metal is evaporated from the target as a function of time. A pair of connectors 127, 129 support the target on stem 111 and are connected to an ohmmeter 131 for measuring the resistance of the target. Ohmmeter 131 may be calibrated so that the time of operation of the device may be read directly on the meter. The resistance of target 123 gradually increases as a function of time. Envelope 133 encloses a heater assembly and target and is sealed to stem 111. The envelope may be filled with gas as in the other embodiments.

The arrangements described are simply yet highly accurate and reliable for measuring the total time the equipment is operated and the indicator or controller may be positioned remotely from the time measuring device. Each of the devices described herein changes measurably as a function of time. The targets in the arrangements in FIGURES 1, 3 and 6 change resistance and the targets in the arrangements of FIGURES 4 and 5 change their light reflecting properties. The devices may be connected to measure the operating time of a component, sub-assembly or complete equipment and integrate the time of operation.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art. It should be understood that any of the embodiments herein may be used with an indicator or a controller or both. Also, any of the embodiments may be provided with a target shield to define the pattern in which the metal is deposited on the target to extend the measurable time scale.

In some instances, it may be desirable to use a combination of the arrangements of FIGURES 3 and 6 for accurately measuring time of operation of the equipment so that greater accuracy is provided over a greater range than would be possible by using either arrangement alone. Under these circumstances, it may be advantageous to evaporate the material from spiral 125 of FIGURE 6 directly onto target 33 of FIGURE 3 and measure the resistance of each target as a measure of time of operation of the equipment.

What is claimed is:

1. A device for sensing the time during which a voltage is applied thereto, comprising an envelope, a target a source of metal and a heater within the envelope, an inert gas within the envelope at a pressure to provide a mean-free path less than the distance between the heater and the target said heater being energized by the voltage and being arranged relative to the target and the source of metal to vary the amount of metal on the target by evaporation as a function of time of energization of the heater, and means for measuring the quantity of metal on the target.

2. A device as claimed in claim 1 in which the means for measuring the quantity of metal on the target comprises an ohmmeter for measuring the resistance of the target.

3. A device as claimed in claim 1 in which the means for measuring the quantity of metal on the target include a relay connected in circuit relationship with said target and operable after a predetermined time of energization of the heater.

4. A device for sensing the time during which a voltage is applied thereto, comprising a target, a metal coated heater energized by the voltage and being arranged relative to the target to deposit metal on the target by evaporation, an envelope enclosing the target and heater, and an inert gas within the envelope at a pressure to provide a mean free path less than the distance between the heater and target.

5. A device for sensing the time during which a voltage is applied thereto, comprising a target, a heater adapted to be energized by the voltage and closely associated with the target and formed of a high melting point metal covered by a lower melting point metal for deposit on the target as a function of time of energization of the heater an envelope enclosing the target and heater, and an inert gas within the envelope at a pressure to provide a mean-free path less than the distance between the heater and the target.

6. A device for measuring the time during which a voltage is applied thereto, comprising a target, a heater adapted to be energized by the voltage and arranged to deposit metal on the target, and means for measuring the quantity of metal deposited on the target including a light beam projected on the target and photosensitive means for measuring the light reflected from the target.

7. A device for measuring the time during which a voltage is applied thereto, comprising an envelope including a target on its inner surface, a heater adapted to be energized by the voltage and positioned within the envelope and arranged to deposit metal on the target, and means for measuring the quantity of metal deposited on the target including a light beam projected on the target and photosensitive means arranged to measure the light reflected from the target.

8. A device for measuring the time during which a voltage is applied thereto, comprising a target, a heater energized by the voltage and arranged to deposit metal on the target, and means for measuring the quantity of metal deposited on the target comprising a light beam projected on the target and photosensitive means arranged to measure the quantity of light projected through the target.

9. A device for measuring the time during which a voltage is applied thereto, comprising an envelope including a target on its inner surface, a heater adapted to be energized by the voltage and positioned within the envelope and arranged to deposit metal on the target, and means for measuring the quantity of metal deposited on the target including a light beam projected on the target and photosensitive means arranged to measure light passing through the target.

10. A device for measuring the time during which a voltage is applied thereto, comprising a sealed envelope including a target, a heater adapted to be energized by the voltage and positioned within the envelope and arranged to deposit metal onto the target, photosensitive means positioned within the envelope, a shield between the photosensitive means and the heater to prevent metal from being deposited on the photosensitive means, and a light beam projected onto the target externally of the device and adapted to energize the photo-sensitive means as a function of the quantity of metal deposited on the target.

11. A device for measuring the time during which a voltage is applied thereto, comprising a target, a heater having a metal coating thereon and adapted to be energized by the voltage and arranged to deposit metal onto the target as a function of time of energization of the heater, and means for measuring the quantity of metal deposited on the target, said last means being photosensitive means for measuring the light reflecting properties of the target.

References Cited in the file of this patent
UNITED STATES PATENTS

| | | |
|---|---|---|
| Re. 24,190 | Kroko | July 31, 1956 |
| 1,682,457 | Zworykin | Aug. 28, 1928 |
| 2,239,452 | Williams et al. | Apr. 22, 1941 |
| 2,338,234 | Dimmick | Jan. 4, 1944 |
| 2,849,583 | Pritikin | Aug. 26, 1958 |
| 2,917,814 | Ruckelshaus | Dec. 22, 1959 |